US008401847B2

(12) United States Patent
Ogata et al.

(10) Patent No.: US 8,401,847 B2
(45) Date of Patent: Mar. 19, 2013

(54) SPEECH RECOGNITION SYSTEM AND PROGRAM THEREFOR

(75) Inventors: Jun Ogata, Ibaraki (JP); Masataka Goto, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 881 days.

(21) Appl. No.: 12/516,888

(22) PCT Filed: Nov. 30, 2007

(86) PCT No.: PCT/JP2007/073210
§ 371 (c)(1),
(2), (4) Date: Aug. 20, 2009

(87) PCT Pub. No.: WO2008/069139
PCT Pub. Date: Jun. 12, 2008

(65) Prior Publication Data
US 2010/0057457 A1 Mar. 4, 2010

(30) Foreign Application Priority Data

Nov. 30, 2006 (JP) .................................. 2006-324498

(51) Int. Cl.
*G10L 15/26* (2006.01)

(52) U.S. Cl. .......... 704/235; 704/270; 704/231; 704/10; 704/254; 704/251

(58) Field of Classification Search .................. 704/235, 704/260, 251, 254, 231, 258, 256, 270, 275, 704/9, 10
See application file for complete search history.

(56) References Cited

U.S. PATENT DOCUMENTS 5,636,325 A * 6/1997 Farrett .......................... 704/258

(Continued)

FOREIGN PATENT DOCUMENTS

GB 2 437 436 10/2007

(Continued)

OTHER PUBLICATIONS

M. Nishida, T, Kawahara, "Speaker Model Selection Based on the Bayesian Information Criterion Applied to Unsupervised Speaker Indexing", IEEE Transactions on Speech and Audio Processing, vol. 13, No. 4, pp. 583-592, Jul. 2005.

(Continued)

Primary Examiner — Vijay B Chawan
(74) Attorney, Agent, or Firm — Rankin, Hill & Clark LLP (57) ABSTRACT

An unknown word is additionally registered in a speech recognition dictionary by utilizing a correction result, and a new pronunciation of the word that has been registered in a speech recognition dictionary is additionally registered in the speech recognition dictionary, thereby increasing the accuracy of speech recognition. The start time and finish time of each phoneme unit in speech data corresponding to each phoneme included in a phoneme sequence acquired by a phoneme sequence converting section 13 are added to the phoneme sequence. A phoneme sequence extracting section 15 extracts from the phoneme sequence a phoneme sequence portion composed of phonemes existing in a segment corresponding to the period from the start time to the finish time of the word segment of the word corrected by a word correcting section 9 and the extracted phoneme sequence portion is determined as the pronunciation of the corrected word. An additional registration section 17 combines the corrected word with the pronunciation determined by a pronunciation determining section 16 and additionally registers the combination as new word pronunciation data in the speech recognition dictionary 5 if it is determined that a word obtained after correction has not been registered in the speech recognition dictionary 5. The additional registration section 17 additionally registers the pronunciation determined by the pronunciation determining section 16 as another pronunciation of the corrected word if it is determined that the corrected word has been registered.

13 Claims, 4 Drawing Sheets

U.S. PATENT DOCUMENTS

| | | | |
|---|---|---|---|
| 5,826,233 A | 10/1998 | Matsumoto | |
| 5,857,173 A * | 1/1999 | Beard et al. | 704/276 |
| 6,233,553 B1 * | 5/2001 | Contolini et al. | 704/220 |
| 6,243,680 B1 * | 6/2001 | Gupta et al. | 704/260 |
| 6,366,882 B1 * | 4/2002 | Bijl et al. | 704/235 |
| 6,389,394 B1 * | 5/2002 | Fanty | 704/249 |
| 6,985,861 B2 * | 1/2006 | Van Thong et al. | 704/254 |
| 7,089,188 B2 * | 8/2006 | Logan et al. | 704/270 |
| 7,203,642 B2 * | 4/2007 | Ishii et al. | 704/231 |
| 7,406,408 B1 * | 7/2008 | Lackey et al. | 704/8 |
| 7,430,503 B1 * | 9/2008 | Walker | 704/8 |
| 7,529,668 B2 * | 5/2009 | Abrego et al. | 704/244 |
| 7,606,710 B2 * | 10/2009 | Wang et al. | 704/260 |
| 8,204,748 B2 * | 6/2012 | Proux et al. | 704/270 |
| 8,244,540 B2 * | 8/2012 | Proux et al. | 704/270 |
| 2002/0188448 A1 * | 12/2002 | Goodman et al. | 704/254 |
| 2003/0187649 A1 * | 10/2003 | Logan et al. | 704/260 |
| 2005/0065796 A1 * | 3/2005 | Wyss et al. | 704/270 |
| 2005/0131559 A1 * | 6/2005 | Kahn et al. | 700/94 |
| 2005/0143998 A1 | 6/2005 | Ogawa | |
| 2005/0261903 A1 | 11/2005 | Kawazoe et al. | |
| 2006/0020461 A1 | 1/2006 | Ogawa | |
| 2006/0149551 A1 * | 7/2006 | Ganong et al. | 704/270.1 |
| 2006/0161434 A1 * | 7/2006 | Faisman et al. | 704/246 |
| 2007/0106685 A1 * | 5/2007 | Houh et al. | 707/102 |
| 2007/0118364 A1 * | 5/2007 | Wise et al. | 704/215 |
| 2009/0055185 A1 * | 2/2009 | Nakade et al. | 704/257 |
| 2010/0070263 A1 * | 3/2010 | Goto et al. | 704/8 |

FOREIGN PATENT DOCUMENTS

| | | |
|---|---|---|
| GB | 2437436 | 10/2007 |
| JP | 09-311692 | 12/1997 |
| JP | 2003-044079 A | 2/2003 |
| JP | 2003-271183 | 9/2003 |
| JP | 2003-271629 | 9/2003 |
| JP | 2003-280683 A | 10/2003 |
| JP | 2004-157919 A | 6/2004 |
| JP | 2004-170765 A | 6/2004 |
| JP | 2004-341293 | 12/2004 |
| JP | 2005-227510 | 8/2005 |
| JP | 2005-241829 A | 9/2005 |
| JP | 2005-331882 A | 12/2005 |
| JP | 2006-038895 A | 2/2006 |
| JP | 2006-146008 A | 6/2006 |
| JP | 2006-243575 A | 9/2006 |

OTHER PUBLICATIONS

R. Schwartz, T. Imai, et al., "A Maximum Likelihood Model for Topic Classification of Broadcast News", Eurospeech-1997, pp. 1455-1458.

Kawahara, et al. Overview of Activities and Software of Continuous Speech Recognition Consortium and Overview of Final Version of Software, Shingakugihou, SP2003-169,2003.

Kokubo, et al. "Efficient Decoding Method for OOV Words Recognition with Subword Models", IPSJ Magazine vol. 43, No. 7, pp. 2082-2090 (2002).

* cited by examiner

SPEECH RECOGNITION SYSTEM AND PROGRAM THEREFOR

TECHNICAL FIELD

The present invention relates to a speech recognition system that converts speech data into text data and a program therefor.

BACKGROUND ART

In a speech recognition technique, a large volume of word pronunciation data each constituted by a combination of a given word and one or more corresponding pronunciations are collected to create a speech recognition dictionary. Each of the pronunciations includes one or more phonemes. The speech recognition dictionary converts speech data into text data. Jpn. Pat. Appln. Publication No. 2006-146008 discloses a speech recognition technique that displays competitive candidates for a word included in text data obtained by speech recognition so as to facilitate correction. Since the competitive candidates are displayed together with the converted text data in the known speech recognition technique, the correction work has dramatically been speeded up. Patent Document 1: Jpn. Pat. Appln. Laid-Open Publication No. 2006-146008

DISCLOSURE OF THE INVENTION

Problems to be Solved by the Invention

Conventional speech recognition techniques have a problem that speech recognition cannot be applied to an unknown word that has not been registered in a speech recognition dictionary. Further, in the abovementioned conventional technique in which the competitive candidates are displayed so as to facilitate correction, a result of the correction is not reflected in an increase in accuracy of the speech recognition dictionary. That is, in the conventional techniques, even if correction is made to a word that is pronounced with a pronunciation that has not been registered in the speech recognition dictionary, the correction is not utilized for training. Thus, the accuracy of speech recognition has not been improved.

An object of the present invention is to provide a speech recognition system that additionally registers an unknown word in a speech recognition dictionary according to a correction result and additionally registers a new pronunciation of the word that has already been registered in the speech recognition dictionary so as to increase the accuracy of speech recognition and a program for the speech recognition system.

Means for Solving the Problems

A speech recognition system according to the present invention includes a speech recognition section, a word correcting section, a phoneme sequence converting section, a phoneme sequence extracting section, a pronunciation determining section, and an additional registration section. A program for speech recognition system according to the present invention is a program that causes a computer to function as a speech recognition section, a word correcting section, a phoneme sequence converting section, a phoneme sequence extracting section, a pronunciation determining section, and an additional registration section.

The speech recognition section converts speech data into text data by using a speech recognition dictionary. The speech recognition dictionary contains a large volume of word pronunciation data each constituted by a combination of a word and one or more corresponding pronunciations. Each of the pronunciations includes one or more phonemes. In addition, the speech recognition section has a function of adding to the text data a start time and a finish time of a word segment in the speech data corresponding to each word included in text data.

The word correcting section presents competitive candidates for each word in the text data acquired from the speech recognition section. The word correction section allows each word to be corrected by selecting a correct word from among the competitive candidates if the correct word is included in the competitive candidates. The word correcting section allows each word to be corrected by manually inputting a correct word if no correct word is included in the competitive candidates.

The phoneme sequence converting section recognizes the speech data in units of phoneme and converts the recognized speech data into a phoneme sequence composed of a plurality of phonemes. The phoneme sequence converting section has a function of adding to the phoneme sequence a start time and a finish time of each phoneme unit in the speech data corresponding to each phoneme included in the phoneme sequence. The phoneme sequence converting section may be a known phoneme typewriter.

The phoneme sequence extracting section extracts from the phoneme sequence a phoneme sequence portion composed of one or more phonemes existing in a segment corresponding to a period from the start time and finish time of the word segment of a word corrected by the word correcting section. That is, the phoneme sequence extracting section extracts the phoneme sequence portion representing the pronunciation of the corrected word from the phoneme sequence. The pronunciation determining section determines the phoneme sequence portion as the pronunciation of the word corrected by the word correcting section.

The additional registration section combines the corrected word with the pronunciation determined by the pronunciation determining section as new word pronunciation data and additionally registers the new word pronunciation data in the speech recognition dictionary if it is determined that the corrected word has not been registered in the speech recognition dictionary. The additional registration section additionally registers the pronunciation determined by the pronunciation determining section in the speech recognition dictionary as another pronunciation of the corrected word if it is determined that the corrected word is a registered word that has already been registered in the speech dictionary.

According to the present invention, a pronunciation is determined for a word to be corrected. If the word is an unknown word that has not been registered in the speech recognition dictionary, the word and its pronunciation are registered in the speech recognition dictionary. Therefore, the more the correction operation is performed, the more the number of unknown words registered in the speech recognition dictionary is increased, resulting in an increase in speech recognition accuracy. Further, if the word to be corrected is a registered word, a new pronunciation of the word is registered in the speech recognition dictionary. Thus, when a speech of the same pronunciation is input in the subsequent speech recognition performed after the correction, speech recognition can properly be made. As a result, a correction result can be reflected in an increase in the accuracy of the speech recognition dictionary, making it possible to increase the accuracy of speech recognition as compared to conventional speech recognition techniques.

If the correction for text data has not been completed, it is preferable to perform speech recognition for an uncorrected portion once again by using the unknown word or new pronunciation added to the speech recognition dictionary. That is, it is preferable to allow the speech recognition section to perform speech recognition for speech data corresponding to an uncorrected portion in the text data once again every time the additional recognition section makes an additional registration. With this configuration, speech recognition is updated immediately after a new registration is added to the speech recognition dictionary, thus promptly reflecting the new registration in speech recognition. As a result, speech recognition accuracy for an uncorrected portion is promptly increased to reduce the number of corrections made to the text data.

In order to further increase the accuracy of speech recognition, a speaker recognition section is provided. The speaker recognition section identifies the speaker type (acoustic similarity between speakers) on the basis of speech data. Further, a dictionary selecting section is provided. The dictionary selecting section selects a speech recognition dictionary corresponding to the speaker type identified by the speaker recognition section from among a plurality of speech recognition dictionaries that have been previously prepared corresponding to the speaker type as a speech recognition dictionary to be used in the speech recognition section. With this configuration, speech recognition can be performed by using a speech recognition dictionary corresponding to the speaker type, thereby further increasing the accuracy of speech recognition.

Further, a speech recognition dictionary corresponding to the content of speech data may be used. In this case, a topic field identifying section and a dictionary selecting section are further provided. The topic field identifying section identifies the topic field of spoken content based on speech data. The dictionary selecting section selects a speech recognition dictionary corresponding to the topic field identified by the topic field identifying section from among the plurality of speech recognition dictionaries that have been previously prepared according to the plurality of topic fields as a speech recognition dictionary to be used in the speech recognition section.

BEST MODE FOR CARRYING OUT THE INVENTION

Figure 1:
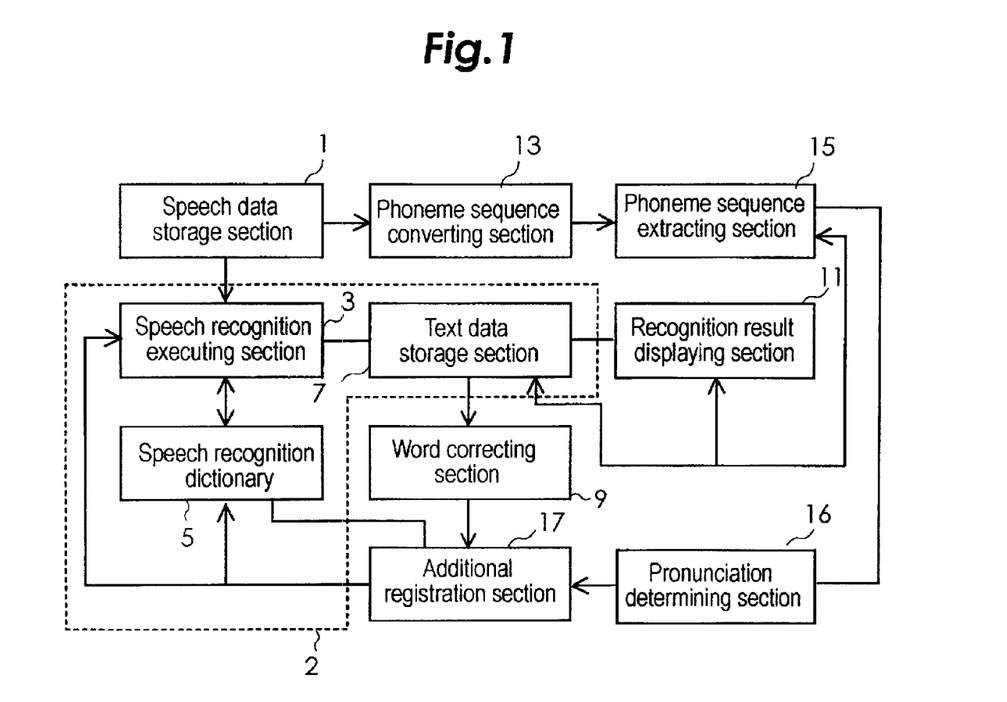
FIG. 1 is a block diagram showing a configuration of a speech recognition system according to an embodiment of the present invention.
Figure 2:
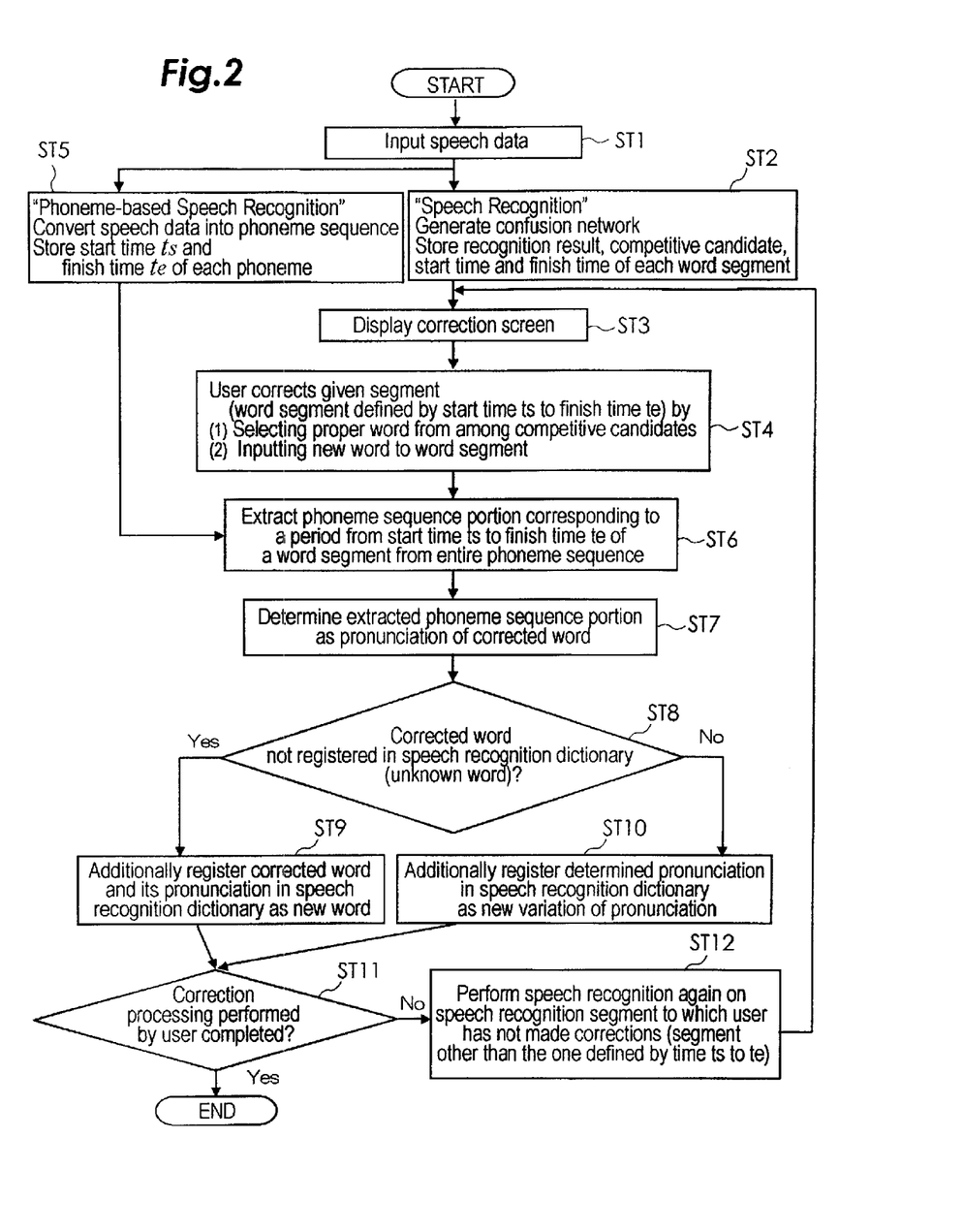
FIG. 2 is a flowchart showing an example of algorithm of a software program that is used when the configuration of FIG. 1 is implemented by using a computer.

A speech recognition system and a program for speech recognition system according to an embodiment of the present invention will be described in detail below with reference to the accompanying drawings. FIG. 1 is a block diagram showing a configuration of the speech recognition system according to an embodiment of the present invention. The speech recognition system includes a speech data storage section 1, a speech recognition section 2, a speech recognition executing section 3, a speech recognition dictionary 5, a text data storage section 7, a word correcting section 9, a recognition result displaying section 11, a phoneme sequence converting section 13, a phoneme sequence extracting section 15, a pronunciation determining section 16, and an additional registration section 17. FIG. 2 is a flowchart showing an example of algorithm of a software program that is used when the configuration of the embodiment shown in FIG. 1 is implemented by using a computer. The speech data storage section 1 stores a plurality of speech data that a means for collecting speech data like a Web crawler has collected. The Web crawler is a means for collecting speech data implemented by a program that collects web pages around the world so as to create a search database of a full-text search engine. The speech data is generally an MP3 file which is available from a web site via the Internet.

The speech recognition section 2 includes a speech recognition executing section 3 and a text data storage section 7. The speech recognition execution section 3 converts speech data into text data by using a speech recognition dictionary 5 containing a large volume of word pronunciation data each constituted by a combination of a given word and one or more corresponding pronunciations. Each pronunciation includes one or more phonemes. The text data storage section 7 stores text data obtained through speech recognition performed by the speech recognition executing section 3. The speech recognition section 2 has a function of adding to the text data a start time and a finish time of a word segment in speech data corresponding to each word included in text data. This function is executed at the same time that speech recognition is performed by the speech recognition executing section 3. As a speech recognition technique, various known speech recognition techniques may be used. Particularly, in the present embodiment, a speech recognition executing section 3 has a function of adding to the text data such data as are used to display competitive candidates that compete with a word in text data obtained by speech recognition.

The word correcting section 9 presents the competitive candidates for each word in the text data acquired from the speech recognition section 2. If a correct word is listed or included in the competitive candidates, the word correcting section 9 allows each word to be corrected by selecting the correct word from among the competitive candidates. If no correct word is listed or included in the competitive candidates, the word correcting section 9 allows the word to be corrected by manually inputting the correct word.

Specifically, in the present embodiment, as the speech recognition technique used in the speech recognition executing section 3 and word correction technique used in the word correcting section 9, a large vocabulary continuous speech recognizer is used. The large vocabulary continuous speech recognizer has a function of generating competitive candidates with degree of reliability (confusion network), which have already been applied for patent by the present inventor in 2004 and published as Jpn. Pat Appln. Publication No. 2006-146008. In this speech recognizer, the competitive candidates are displayed for correction. The configurations of the speech recognition section 2 and word correcting section 9 have been described in detail in Jpn. Pat. Appln. Publication No. 2006-146008 and descriptions thereof are omitted here.

Figure 3:
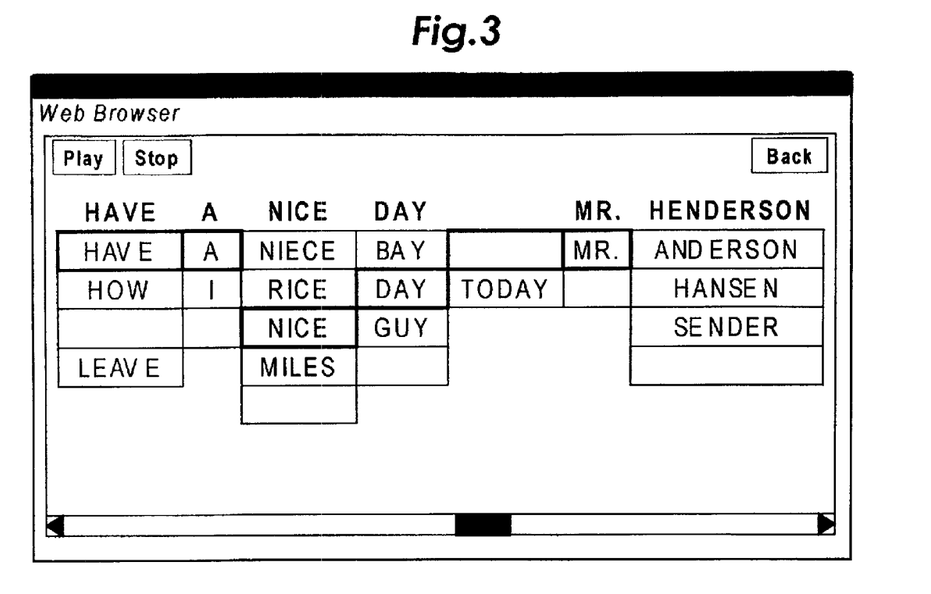
FIG. 3 shows an example of an interface used in a word correcting section.

FIG. 3 shows an example of an interface that is used in the word correcting section 9. In FIG. 3, word segments are arranged in a line as recognition results and, under each of the word segments, a list of competitive candidates is displayed. How the list of competitive candidates is displayed has been described in detail in Jpn. Pat. Appln. Publication No. 2006-146008. Since the competitive candidates are always displayed, it is possible to make correction simply by sequentially selecting a correct word, thereby saving the trouble of clicking an error portion and confirming the candidates. If the large number of competitive candidates are displayed, it indicates that the speech recognition results are indefinite (the speech recognizer is less sure). The competitive candidates for each word segment are arranged in descending order in terms of reliability. Thus, in many cases, a correct word can be found quickly by checking the candidates from top to bottom. The competitive candidates for each word segment inevitably include a blank candidate. The blank candidate is called "deletion candidate" and has a role of invalidating the recognition result for a corresponding word segment. That is, simply by clicking the "deletion candidate", it is possible to easily delete a portion in which an extra word has been inserted. The configuration in which the competitive candidates are arranged in the descending order in terms of reliability and configuration concerning the deletion candidate have also been described disclosed in detail in Jpn. Pat. Appln. Publication No. 2006-146008.

The phoneme sequence converting section 13 recognizes speech data acquired from the speech data storage section 1 in units of phoneme and converts it into a phoneme sequence composed of a plurality of phonemes. The phoneme sequence converting section 13 has a function of adding to the phoneme sequence a start time and a finish time of each phoneme unit in the speech data corresponding to each phoneme included in a phoneme sequence. As the phoneme sequence converting section 13, a known phoneme typewriter may be used.

Figure 4:
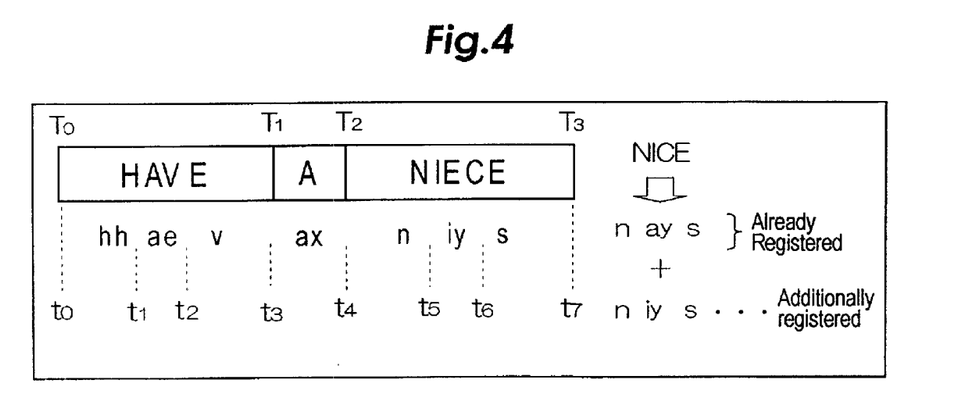
FIG. 4 explains an example of additional registration of a variation of a pronunciation.

FIG. 4 explains an example of additional registration of a pronunciation to be described below. "hh ae v ax n iy s" shown in FIG. 4 denotes a result obtained by converting speech data into a phoneme sequence by using a phoneme typewriter. $t_0$ to $t_7$ shown below "hh ae v ax n iy s" represent the start time and finish time of each phoneme unit. That is, the start time of the first phoneme unit "hh" is $t_0$ and finish time thereof is $t_1$.

The phoneme sequence extracting section 15 extracts from the phoneme sequence a phoneme sequence portion composed of one or more phonemes existing in a segment corresponding to the period from the start time and finish time of the word segment of a word corrected by the word correcting section 9. For example, as shown in FIG. 4, the word to be corrected is "NIECE", the start time of the word segment "NIECE" is $T_2$, (see the upper portion of the word segment "NIECE") and finish time thereof is $T_3$, and the phoneme sequence portion existing in the word segment "NIECE" is "n iy s". Thus, the phoneme sequence extracting section 15 extracts the phoneme sequence portion "n iy s" representing the pronunciation of the word "NIECE" from the phoneme sequence. In the example shown in FIG. 4, the "NIECE" is corrected to "NICE" by the word correcting section 9.

The pronunciation determining section 16 determines the phoneme sequence portion "n iy s" as the pronunciation of the word corrected by the word correcting section 9.

The additional registration section 17, combines the corrected word with the pronunciation determined by the pronunciation determining section 16 as new word pronunciation data and additionally registers the new word pronunciation data in the speech recognition dictionary 5 if it is determined that the corrected word has not been registered in the speech recognition dictionary 5. The additional registration section 17 additionally registers the pronunciation determined by the pronunciation determining section 16 in the speech recognition dictionary 5 as another pronunciation of the corrected word if it is determined that the corrected word is a registered word that has already been registered in the speech recognition dictionary 5.

Figure 5:
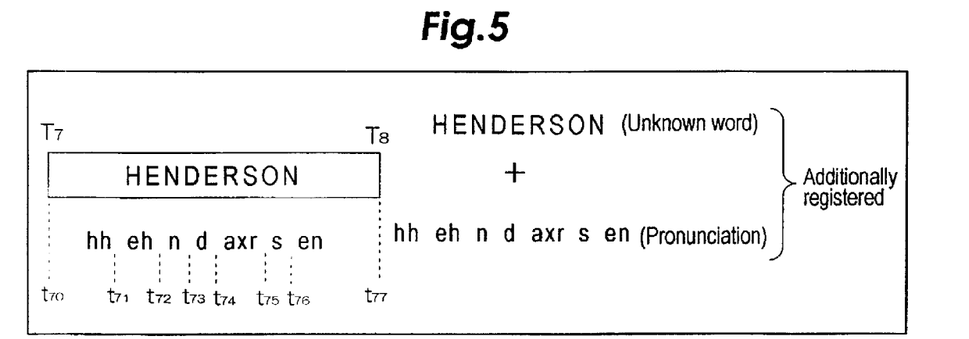
FIG. 5 explains additional registration of an unknown word.

For example, as shown in FIG. 5, assuming that a character string "HENDERSON" is an unknown word that has been corrected by manual input, the phoneme sequence portion "hh eh nd axr s en" is determined as the pronunciation of the manually input word "HENDERSON". If the word "HENDERSON" is an unknown word that has not been registered in the speech recognition dictionary 5, the additional registration section 17 registers the word "HENDERSON" and the pronunciation "hh eh nd axr s en" in the speech recognition dictionary 5. In order to associate the corrected word with the pronunciation, time $T_7$ to $T_8$ of the word segment and time $t_{70}$ to $t_{77}$ in the phoneme sequence are utilized. As described above, according to the present embodiment, an unknown word can be registered. Accordingly, the more often correction is made with an unknown word, the more the number of unknown words will be registered in the speech recognition dictionary 5, thereby increasing speech recognition accuracy. Further, as shown in FIG. 4, if the word "NIECE" to be corrected is corrected to a word "NICE" that has been registered in the speech recognition dictionary 5, "n iy s" is registered in the speech recognition dictionary as a new pronunciation of the word "NICE". That is, if "n ay s" has been registered in the speech recognition dictionary 5 as the pronunciation of the word "NICE" as shown in FIG. 4, "n iy s" is additionally registered in the speech recognition dictionary. In order to associate the registered word with new pronunciation, time $T_2$ to $T_3$ of the word segment and time $t_4$ to $t_7$ in the phoneme sequence are utilized. Thus, if the same pronunciation "n iy s" is input once again in the subsequent speech recognition performed after the above correction, the word "NICE" can be speech-recognized. As a result, according to the present invention, a correction result of the text data obtained by speech recognition can be reflected in an increase in accuracy of the speech recognition dictionary 5. Thus, it is possible to increase the accuracy of speech recognition as compared to conventional speech recognition techniques.

If the correction for text data corresponding to speech data being handled has not been completed, it is preferable to perform speech recognition for an uncorrected portion once again by using the unknown word or new pronunciation added to the speech recognition dictionary 5. That is, it is preferable to allow the speech recognition section 2 to perform speech recognition for speech data corresponding to an uncorrected portion in the text data once again every time the additional recognition section 17 makes an additional registration. With this configuration, speech recognition is updated immediately after a new registration is added to the speech recognition dictionary 5, thus promptly reflecting the new registration in speech recognition. As a result, speech recognition accuracy for an uncorrected portion is promptly increased to reduce the number of corrections that is made to the text data.

The algorithm of FIG. 2 shows the process when the configuration of this embodiment is applied to the following case. Speech data obtained from websites are stored in the speech data storage section 1. The speech data are converted into text data by means of speech recognition. Then, the text data are corrected in response to correction instructions from a general user terminal. Thus, in this example, a correction inputting portion of the word correcting section 9 corresponds to a user terminal. As a matter of course, the correction may be made not by the user but by a system administrator. In this case, all components of the word correcting section 9 including the correction inputting portion exist in the system. First, in the algorithm as shown in FIG. 2, speech data is input in step ST1. In step ST2, speech recognition is performed and, for the subsequent correction, a confusion network is generated so as to obtain competitive candidates. The confusion network has been described in detail in Jpn. Pat. Appln. Publication No. 2006-146008 and the description thereof is omitted here. Further, in step ST2, a recognition result and competitive candidates are stored, and the start time and finish time of each word segment are stored. In step ST3, a correction screen (interface) as shown in FIG. 3 is displayed. In step ST4, correction operation is performed. More specifically, a user enters from a user terminal a correction instruction for correcting the word segment. The correction instruction indicates (1) which word should be selected as a correct word from among the competitive candidates; and (2) a new word should be additionally input to the word segment. After completion of entry of the correction instruction, the correction instruction from the user terminal is transmitted to the word correcting section 9 of the speech recognition system, and then the word correcting section 9 executes the received instruction.

In parallel with process from steps ST2 to ST4, conversion of the speech data into a phoneme sequence is performed by using a phonemic typewriter in step ST5. That is, "phoneme-based Speech Recognition" is performed. At the same time, the start time and finish time of each phoneme are stored together with a speech recognition result. In step ST6, a phoneme sequence portion corresponding to the time period (from start time ts to finish time te of a word segment) segmenting a word to be corrected is extracted from the entire phoneme sequence.

In step ST7, the extracted phoneme sequence portion is determined as the pronunciation of the corrected word. In step ST8, it is determined whether the corrected word has been registered in the speech recognition dictionary 5 (i.e., whether the corrected word is an unknown word or not). If it has been determined that the corrected word is an unknown word, the process goes to step ST9 where the corrected word is registered in the speech recognition dictionary 5 as a new word together with the pronunciation thereof. If it has been determined that the corrected word is not an unknown word but a registered word, the process goes to step ST10. In step ST10, the pronunciation determined in step ST 7 is additionally registered in the speech recognition dictionary 5 as a new variation of pronunciation.

After completion of the additional registration, it is determined in step ST11 whether the correction process performed by the user has been completed, i.e., it is determined whether there is any uncorrected speech recognition segment. If it has been determined that there is no uncorrected speech recognition segment, the process is ended. If it has been determined that there is any uncorrected speech recognition segment, the process goes to step ST12 where an uncorrected speech recognition segment is subjected to speech recognition once again. Then, the process returns to step ST3.

Figure 6:
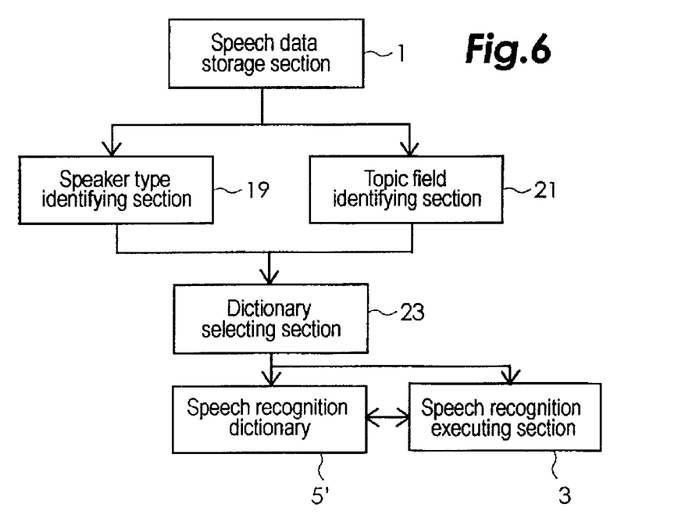
FIG. 6 is a block diagram of a configuration of the main part of a modification example of the present invention.

FIG. 6 is a block diagram showing a configuration of the main part of a modification example of the present embodiment, which is arranged for the purpose of further increasing the accuracy of speech recognition. As shown in FIG. 6, in this modification example, a speaker recognition section 19 and a topic field identifying section 21 are provided. The speaker recognition section 19 identifies the speaker type based on speech data. The topic field identifying section 21 identifies the topic field of spoken content based on speech data. In the modification example of FIG. 6, a plurality of speech recognition dictionaries prepared in accordance corresponding to the speaker types and a plurality of speech recognition dictionaries prepared in accordance corresponding to a plurality of topic fields are incorporated in a speech recognition dictionary 5'. A dictionary selecting section 23 selects a speech recognition dictionary corresponding to the speaker type identified by the speaker recognition section 19 from among the plurality of speech recognition dictionaries 5 that have been previously prepared corresponding to the speaker types as a speech recognition dictionary used in the speech recognition executing section 3. A technique for implementing the speaker recognition section 19 has been described in, e.g., M. Nishida and T. Kawahara, "Speaker Model Selection Based on Bayesian Information Criterion Applied to Unsupervised Speaker Indexing," IEEE Transactions on Speech and Audio Processing, Vol. 13, No. 4, pp. 583-592, 2005. Further, the dictionary selecting section 23 selects a speech recognition dictionary corresponding to the topic field identified by the topic field identifying section 21 from among the plurality of speech recognition dictionaries that have been previously prepared corresponding to the topic fields as a speech recognition dictionary used in the speech recognition executing section 3. A technique for implementing the topic field identifying section 21 has been described in, e.g., R. Schwartz, T. Imai, F. Kubala, L. Nguyen, J. Makhoul, "A maximum likelihood model for topic classification of broadcastnews" Proc. Eurospeech '97, pp. 1455-1458 (1997). With this configuration, speech recognition can be performed by using a speech recognition dictionary corresponding to the speaker type or a speech recognition dictionary corresponding to the content of speech data, thereby further increasing the accuracy of speech recognition. Unlike the configuration of FIG. 6, it is not necessary to allow both the speech recognition dictionary corresponding to the speaker type and speech recognition dictionary corresponding to the content of speech data to be selected, and either one of the technical speech recognition dictionaries may be selected. In this configuration, either one of the speaker recognition section 19 and topic field identifying section 21 may be provided in the system.

A small scale experiment using speech data included in a Podcast in the website was made in order to evaluate the effect of the present invention. As data used in the evaluation, two Podcasts posted in "Business Line by Podcasting, Nikkan Kogyo Shinbun [http://www.btoday.net/broadcast/archives/009nikkan/]" published on Aug. 23, 24, 2006 are used. In this experiment, training of a new pronunciation (corresponding to FIG. 4) and leaning of an unknown word (corresponding to FIG. 5) were performed by using the speech data published on Aug. 23, 2006 and results of corrections made by users for the speech data. Then, recognition performance was examined by using another speech data published on Aug. 24, 2006.

As a language model, 60,000-word bigram language model learned from texts of newspaper articles from 1991 to 2002 is used with reference to CSRC software 2003 [kawahara, Takeda, Ito, Lee, shikano, and Yamada: "Overview of Activities and Software of Continuous Speech Recognition Consortium," Shingakugihou, SP2003-169, 2003]. The following experiment result was obtained.

|  | Number of unknown words | Recognition rate |
| --- | --- | --- |
| Baseline | 10 | 74.1% |
| Present Embodiment | 3 | 77.9% |

The "Baseline" shows the result by using a conventional approach which does not perform additional registration of unknown words and pronunciation variations. The "Present Embodiment" is a result obtained by performing speech recognition using a speech recognition dictionary whose accuracy has been increased by additionally registering unknown words and new pronunciations. As can be seen from the above result, the number of unknown words has been reduced and recognition rate has been improved. Further, it has been found that the present invention demonstrates advantageous effects especially for a Podcast of the same program. In most cases, a single speaker speaks in a Podcast of the same program and, accordingly, regular phrases and pronunciation patterns are repeated on a daily basis.

INDUSTRIAL APPLICABILITY

According to the present invention, a pronunciation is determined for a word to be corrected and, if the word is an unknown word that has not been registered in the speech recognition dictionary, the word and its pronunciation are registered in the speech recognition dictionary. Therefore, the more the correction operation is performed, the more the number of unknown words registered in the speech recognition dictionary is increased, resulting in an increase in speech recognition accuracy. Further, if the word to be corrected is a registered word, a new pronunciation of the word is registered in the speech recognition dictionary. Thus, if a speech of the same pronunciation is input in the subsequent speech recognition performed after the correction, speech recognition can properly be made. As a result, a correction result can be reflected in an increase in the accuracy of the speech recognition dictionary, making it possible to increase the accuracy of speech recognition as compared to conventional speech recognition techniques.

The invention claimed is:

1. A speech recognition system comprising:
a speech recognition section that converts speech data into text data by using a speech recognition dictionary containing a large volume of word pronunciation data each constituted by a combination of a word and one or more corresponding pronunciations, each pronunciation including one or more phonemes, and that has a function of adding to the text data a start time and a finish time of a word segment in the speech data corresponding to each word included in text data;
a word correcting section that presents competitive candidates for each word in the text data acquired from the speech recognition section, allows each word to be corrected by selecting a correct word from among the competitive candidates for correction if the correct word is included in the competitive candidates, or by manually inputting a correct word if no correct word is included in the competitive candidates;
a phoneme sequence converting section that recognizes the speech data in units of phoneme, converts the recognized speech data into a phoneme sequence composed of a plurality of phonemes, and that has a function of adding to the phoneme sequence a start time and a finish time of each phoneme unit in the speech data corresponding to each phoneme included in the phoneme sequence;
a phoneme sequence extracting section that extracts from the phoneme sequence a phoneme sequence portion composed of one or more phonemes existing in a segment corresponding to a period of the start time and finish time of the word segment of a word corrected by the word correcting section;
a pronunciation determining section that determines the phoneme sequence portion as the pronunciation of the word corrected by the word correcting section; and
an additional registration section that combines the corrected word with the pronunciation determined by the pronunciation determining section as new word pronunciation data and additionally registers the new word pronunciation data in the speech recognition dictionary if it is determined that the corrected word has not been registered in the speech recognition dictionary, or additionally registers the pronunciation determined by the pronunciation determining section in the speech recognition dictionary as another pronunciation of the corrected word if it is determined that the corrected word is a registered word that has already been registered in the speech recognition dictionary.

2. The speech recognition system according to claim 1, wherein
the speech recognition section performs speech recognition once again for speech data corresponding to an uncorrected portion of the text data that has not been subjected to correction when the additional registration section makes a new additional registration.

3. The speech recognition system according to claim 1, further comprising:
a speaker recognition section that identifies the speaker type based on the speech data; and
a dictionary selecting section that selects a speech recognition dictionary corresponding to the speaker type identified by the speaker recognition section from among a plurality of speech recognition dictionaries that have been previously prepared corresponding to the speaker type as a speech recognition dictionary to be used in the speech recognition section.

4. The speech recognition system according to claim 1, further comprising:
a topic field identifying section that identifies a topic field of spoken content based on the speech data; and
a dictionary selecting section that selects a speech recognition dictionary corresponding to the topic field identified by the topic field identifying section from among a plurality of speech recognition dictionaries that have been previously prepared corresponding to the plurality of topic fields as a speech recognition dictionary to be used in the speech recognition section.

5. The speech recognition system according to claim 1, wherein
the phoneme sequence converting section is a phonemic typewriter.

6. The speech recognition system according to claim 2, further comprising:
a speaker recognition section that identifies the speaker type based on the speech data; and
a dictionary selecting section that selects a speech recognition dictionary corresponding to the speaker type identified by the speaker recognition section from among a plurality of speech recognition dictionaries that have been previously prepared corresponding to the speaker type as a speech recognition dictionary to be used in the speech recognition section.

7. The speech recognition system according to claim 2, further comprising:
a topic field identifying section that identifies a topic field of spoken content based on the speech data; and
a dictionary selecting section that selects a speech recognition dictionary corresponding to the topic field identified by the topic field identifying section from among a plurality of speech recognition dictionaries that have been previously prepared corresponding to the plurality of topic fields as a speech recognition dictionary to be used in the speech recognition section.

8. A program for speech recognition system that is stored in a computer-readable recording medium, the program causing a computer to function as:

a speech recognition section that converts speech data into text data by using a speech recognition dictionary containing a large volume of word pronunciation data each constituted by a combination of a word and one or more corresponding pronunciations, each pronunciation including one or more phonemes, and that has a function of adding to the text data a start time and a finish time of a word segment in the speech data corresponding to each word included in text data;

a word correcting section that presents competitive candidates for each word in the text data acquired from the speech recognition section, allows each word to be corrected by selecting a correct word from among the competitive candidates for correction if the correct word is included in the competitive candidates, or by manually inputting a correct word if no correct word is included in the competitive candidates;

a phoneme sequence converting section that recognizes the speech data in units of phoneme, converts the recognized speech data into a phoneme sequence composed of a plurality of phonemes, and that has a function of adding to the phoneme sequence a start time and a finish time of each phoneme unit in the speech data corresponding to each phoneme included in the phoneme sequence;

a phoneme sequence extracting section that extracts from the phoneme sequence a phoneme sequence portion composed of one or more phonemes existing in a segment corresponding to a period of the start time and finish time of the word segment of a word corrected by the word correcting section;

a pronunciation determining section that determines the phoneme sequence portion as the pronunciation of the word corrected by the word correcting section; and an additional registration section that combines the corrected word with the pronunciation determined by the pronunciation determining section as new word pronunciation data and additionally registers the new word pronunciation data in the speech recognition dictionary if it is determined that the corrected word has not been registered in the speech recognition dictionary, or additionally registers the pronunciation determined by the pronunciation determining section in the speech recognition dictionary as another pronunciation of the corrected word if it is determined that the corrected word is a registered word that has already been registered in the speech recognition dictionary.

9. The program for speech recognition system according to claim 8, wherein the speech recognition section performs speech recognition once again for speech data corresponding to an uncorrected portion of the text data that has not been subjected to correction when the additional registration section makes a new additional registration.

10. The program for speech recognition system according to claim 8, further causing the computer to function as:

a speaker recognition section that identifies the speaker type based on the speech data; and a dictionary selecting section that selects a speech recognition dictionary corresponding to the speaker type identified by the speaker recognition section from among a plurality of speech recognition dictionaries that have been previously prepared corresponding to the speaker type as a speech recognition dictionary to be used in the speech recognition section.

11. The program for speech recognition system according to claim 8, further causing the computer to function as:

a topic field identifying section that identifies a topic field of spoken content based on the speech data; and a dictionary selecting section that selects a speech recognition dictionary corresponding to the topic field identified by the topic field identifying section from among a plurality of speech recognition dictionaries that have been previously prepared corresponding to the plurality of topic fields as a speech recognition dictionary to be used in the speech recognition section.

12. The program for speech recognition system according to claim 9, further causing the computer to function as:

a speaker recognition section that identifies the speaker type based on the speech data; and a dictionary selecting section that selects a speech recognition dictionary corresponding to the speaker type identified by the speaker recognition section from among a plurality of speech recognition dictionaries that have been previously prepared corresponding to the speaker type as a speech recognition dictionary to be used in the speech recognition section.

13. The program for speech recognition system according to claim 9, further causing the computer to function as:

a topic field identifying section that identifies a topic field of spoken content based on the speech data; and a dictionary selecting section that selects a speech recognition dictionary corresponding to the topic field identified by the topic field identifying section from among a plurality of speech recognition dictionaries that have been previously prepared corresponding to the plurality of topic fields as a speech recognition dictionary to be used in the speech recognition section.

* * * * *